United States Patent
Huang

(10) Patent No.: US 9,045,597 B2
(45) Date of Patent: Jun. 2, 2015

(54) POLYIMIDE COMPOUND HAVING SIDE CHAIN AND MANUFACTURING METHOD THEREOF

(71) Applicant: UNIMICRON TECHNOLOGY CORP., Taoyuan Hsien (TW)

(72) Inventor: Han-Pei Huang, Taoyuan County (TW)

(73) Assignee: Unimicron Technology Corp., Taoyuan Hsien (TW)

( * ) Notice: Subject to any disclaimer, the term of this patent is extended or adjusted under 35 U.S.C. 154(b) by 116 days.

(21) Appl. No.: 13/845,463

(22) Filed: Mar. 18, 2013

(65) Prior Publication Data

US 2014/0275441 A1    Sep. 18, 2014

(51) Int. Cl.
C08G 69/26    (2006.01)
C08G 73/10    (2006.01)

(52) U.S. Cl.
CPC .................. C08G 73/1071 (2013.01)

(58) Field of Classification Search
CPC ... C07D 307/89; C08G 73/10; C08G 73/1017
USPC .......................... 528/271, 310, 332
See application file for complete search history.

(56) References Cited

U.S. PATENT DOCUMENTS

2010/0233488 A1    9/2010    Sonobe
2011/0263791 A1 *  10/2011   Chiong et al. ............... 525/132

FOREIGN PATENT DOCUMENTS

| CN | 102504295 | * | 6/2012 |
| JP | 2012-158711 | A | 8/2012 |
| KR | 10-0235422 | B1 | 12/1999 |
| WO | 95/17449 | A1 | 6/1995 |

OTHER PUBLICATIONS

Hsiao, et al.; "Synthesis and Characterization of Soluble Polyimides Derived from 2',5'-Bis(3,4-dicarboxyphenoxy)-p-terphenyl Dianhydride"; Journal of Polymer Science: Part A: Polymer Chemistry, vol. 42, 1008-1017 (2004).

Espeso, et al.; "Synthesis and Characterization of New Soluble Aromatic Polyamides Based on 4-(1-Adamantyl)-1,3- bis(4-aminophenoxy)benzene"; Journal of Polymer Science: Part A: Polymer Chemistry, vol. 38, 1014-1023 (2000).

"Synthesis and characterization of new polyimides containing bulky adamantyl elements"; Thesis from National Taiwan University of Science and Technology; pp. 1-3 and 25-27; (Taiwan Year 87) Jul. 27, 1998.

Communication From the Taiwan Patent Office Regarding a Foreign Application Dated (Taiwan Year 103) Sep. 24, 2014.

* cited by examiner

*Primary Examiner* — Gregory Listvoyb
(74) *Attorney, Agent, or Firm* — Rosenberg, Klein & Lee

(57) ABSTRACT

A polyimide compound with a large side chain R and R' is provided. The large side chain would interrupt the symmetry and regularity of polyimide compound. The polyimide compound has the general formula shown as formula (I) below:

formula (I)

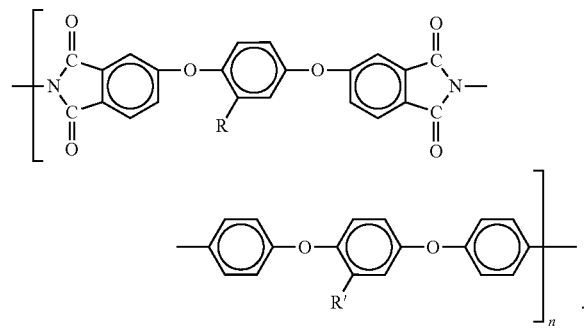

The functional group R and R' are selecting individually from the group consisting: α-substitution cycloalkene with at least a tertiary carbon atom, cycloalkene with at least a tertiary carbon atom, cycloalkane with at least a tertiary carbon atom, α-substitution phenyl, phenyl, α-substitution naphthalyl, naphthalyl, α-substitution phenanthrenyl, phenanthrenyl, α-substitution anthracenyl, anthracenyl, α-substitution adamantyl, adamantyl, α-substitution diamantyl and diamantyl.

5 Claims, No Drawings

POLYIMIDE COMPOUND HAVING SIDE CHAIN AND MANUFACTURING METHOD THEREOF

BACKGROUND

1. Technical Field

The invention relates to polyimide compound and the manufacturing method thereof, and in particular, to polyimide compound with side chain and the manufacturing method thereof.

2. Description of Related Art

The polyimide is a common engineering plastic with well mechanical property, higher glass transition temperature, and higher thermal degradation temperature. Therefore, polyimide is usually used as an insulating material or a heat-resisting material, and is widely implemented in the semiconductor industry, the photoelectrical industry, and the mechanical industry. Nevertheless, polyimide is hard to dissolve in various kinds of the organic solvents, thus the machinability of polyimide is decreased. So far, several experimental reports about modifying the property of polyimide are published, and those researches are intended to increase the solubility of polyimide while the thermal property can be maintained at the same time.

SUMMARY

The present invention provides polyimide compound having a side chain.

The present invention provides a manufacturing method of polyimide compound.

The present invention provides polyimide compound having the side chain. The side chain of the polyimide compound interrupts the symmetry of polyimide compound in structure, and the regularity of polyimide compound in molecular arrangement. The above-mentioned side chain is selected from the group consisting of: α-substitution cycloalkene having at least a tertiary carbon atom, a cycloalkane having at least a tertiary carbon atom, cycloalkene having at least a tertiary carbon atom, phenyl, α-substitution phenyl, naphthalyl, α-substitution naphthalyl, anthracenyl, α-substitution anthracenyl, phenanthrenyl, α-substitution phenanthrenyl, α-substitution aromatic hydrocarbons, aromatic hydrocarbons, adamantyl, α-substitution adamantyl, diamantyl, α-substitution diamantyl.

The present invention provides a manufacturing method of polyimide compound. The method comprising: (A) Under anhydrous condition, dianhydride monomer and diamine monomer are dissolved into cresol by stirring to from polyamic acid compound solution. (B) The 5-10 drops of isoquinoline are added to the polyamic acid compound solution. The solution containing polyamic acid compound solution and isoquinoline is heating refluxed to form polyimide compound solution. (C) The polyimide compound solution is cooled and added to the ethanol. The solid polyimide compound then precipitates out.

To sum up, the present invention provides polyimide compound having the side chain, and the manufacturing method thereof. The above-mention polyimide compound having large side chain has the property of interrupted symmetry in structure and poor regularity in molecular arrangement. Thus, the intermolecular force of polyimide compound is attenuated and the solubility of polyimide compound increases.

In order to further appreciate the characteristic and technical contents of the present invention, references are hereunder made to the detailed descriptions and appended drawings in connection with the present invention. However, the appended drawings are merely shown for exemplary purpose rather than being used to restrict the scope of the present invention.

DESCRIPTION OF THE EXEMPLARY EMBODIMENTS

The present invention provides polyimide compound (d) with side chain. The general formula of polyimide compound (d) is shown as formula (I):

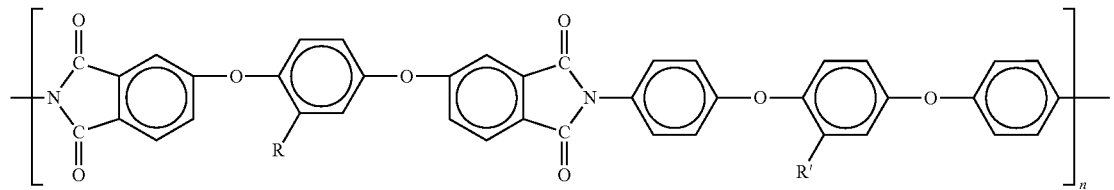

Formula (I)

The functional group R and R' are selected individually from the larger functional group consisting of: α-substitution cycloalkene with at least a tertiary carbon atom, cycloalkane with at least a tertiary carbon atom, cycloalkene with at least a tertiary carbon atom, α-substitution phenyl, phenyl, α-substitution naphthalyl, naphthalyl, α-substitution anthracenyl, anthracenyl, α-substitution phenanthrenyl, phenanthrenyl, α-substitution aromatic hydrocarbons, aromatic hydrocarbons, adamantyl, α-substitution adamantyl, diamantyl, α-substitution diamantyl.

According to the above-mentioned general formula of polyimide compound (d), polyimide compound (d) have the large function group R and R'. The large function group R and R' would interrupt symmetry in structure and regularity in molecular arrangement. It is worth noting that, the "R" and "R'" mentioned hereafter is one of the above-mentioned functional groups and the detailed description of the eight functional groups would be omitted thereafter.

In addition, the polyimide compound (d) is formed by the reaction between the diamine monomer (a) having side chain and dianhydride compound (b) having side chain. The manufacturing method of diamine monomer comprising three main steps: forming hydroquinone compound (a1), forming bis(4-nitrophenoxy) compound (a2), and forming diamine monomer (a3).

The formation of hydroquinone compound (a2) comprises the following steps. Firstly, bromo compound (a1), hydroquinone compound, and benzene are added into the reactor in nitrogen ambient. Next, the reactor is heating refluxed for 3-4 days. The reactor might be the three-necked flask. It is worth noting that nitrogen ambient might prevent the reaction from the influence of the air and the moisture. In addition, the reaction temperature of the process of the heating reflux is about 80-85° C. as the temperature benzene boiling point. After the reaction finished, solid hydroquinone compound (a2) would be separated out. Solid hydroquinone compound (a2) might be obtained directly by filtration. The general formula of bromo compound (a1) is shown as formula (II) below:

formula (II)

The general formula of hydroquinone compound (a2) is shown as formula (III) below:

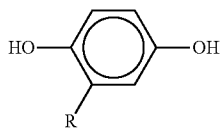

formula (III)

Continued from the preceding paragraph, hydroquinone compound (a2) obtained from filtration is washed by heated water to wash away the excess hydroquinone compound and hydrogen bromide. Hydrogen bromide is the byproduct of the reaction. The temperature of the heated water is about 50-70° C. Next, wet hydroquinone compound (a2) is vacuum dried to remove the solvent and the moisture and to obtain solid hydroquinone compound (a2). Then, solid hydroquinone compound (a2) is recrystallized to enhance the purity of hydroquinone compound (a2). The reaction of forming hydroquinone compound (a2) is listed as reaction (I) below:

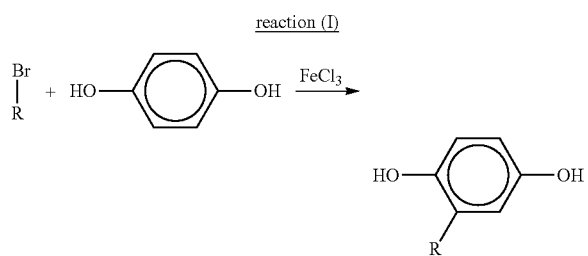

reaction (I)

The formation of bis(4-nitrophenoxy) compound (a3) comprises the following steps. Firstly, purified hydroquinone compound (a2), potassium carbonate, 4-halogen-nitrobenzene, and dimethylformamide are added to the reactor under nitrogen ambient and heated to form bis(4-nitrophenoxy) compound (a3). In the present embodiment, 4-halogen-nitrobenzene is 4-chloronitrobenzene. Alternatively, 4-halogen-nitrobenzene might also be 4-fluoronitrobenzene in other embodiment. The reaction period is 8-14 hours and the reaction temperature is about 120-140° C. After this reaction, solid bis(4-nitrophenoxy) compound (a3) is precipitated out by adding distilled water.

Continued from the preceding paragraph, next, bis(4-nitrophenoxy) compound (a3) is washed by the distilled water to wash away the excess solvent and the remaining residues. Next, solid bis(4-nitrophenoxy) compound (a3) is obtained by vacuum dry. Then, solid bis(4-nitrophenoxy) compound (a3) is dissolved to recrystallize, so as to enhance the purity of bis(4-nitrophenoxy) compound (a3). The general formula of bis(4-nitrophenoxy) compound (a3) is shown as formula (IV) below:

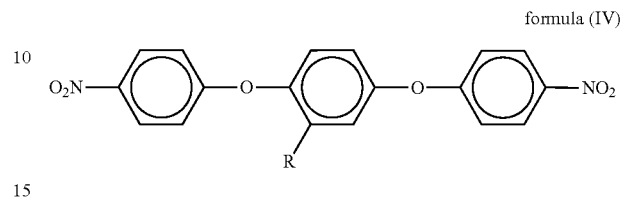

formula (IV)

The reaction of forming bis(4-nitrophenoxy) compound (a3) is listed as reaction (II) below:

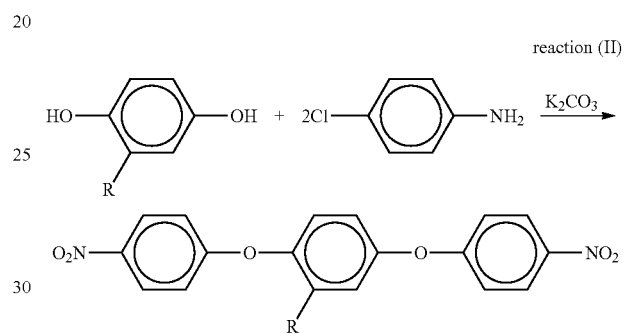

reaction (II)

The formation of diamine monomer (a) comprises the following steps. Firstly, bis(4-nitrophenoxy) compound (a3), hydrazine monohydrate, ethanol, and Pd/C catalyst are added to the reactor and are heating refluxed for 1-2 days. The temperature of the heating reflux process is about 95-115° C. as the temperature of the boiling point of the ethanol. Next, diamine monomer (a) is washed by heated distilled water. The temperature of the heated water is about 70-80° C. Then, diamine monomer (a) is vacuum dried. Then, diamine monomer (a) is recrystallized to enhance the purity of diamine monomer (a). The general formula of diamine monomer (a) is shown as formula (V) below:

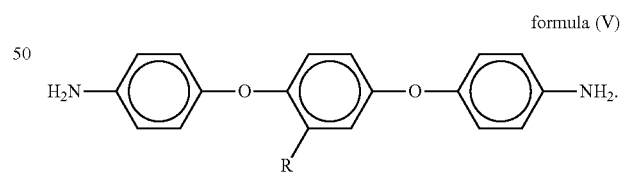

formula (V)

The reaction of forming diamine monomer (a) is listed as reaction (III) below:

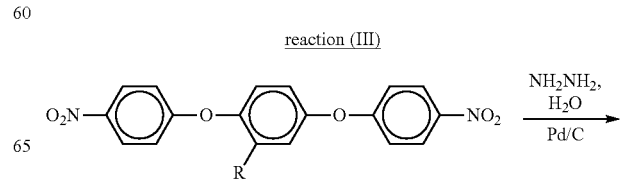

reaction (III)

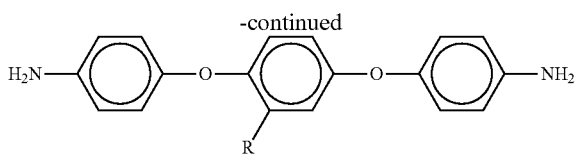

In the following paragraph, adamantyl is chosen to be the functional group R of diamine monomer (a) in this embodiment. However, the embodiment is merely shown for exemplary purpose rather than being used to restrict the scope of the present invention.

First Embodiment

The diamine monomer (a) in the first embodiment of the present invention is 1,4-bis(4-aminophenoxy)-2-adamantyl benzene, the formula of the 1,4-bis(4-aminophenoxy)-2-adamantyl benzene is shown as formula (VI) below formula (VI)

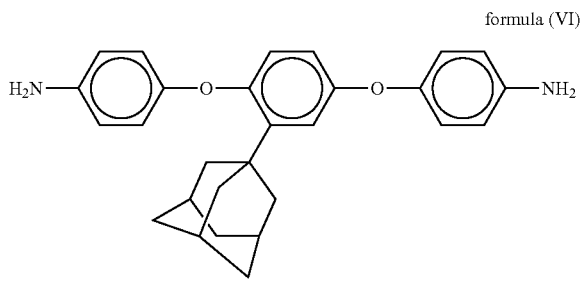

The formation of the diamine monomer comprises the following three steps: forming the 2-adamantyl hydroquinone, forming 1,4-bis(4-notrophenoxy)-2-adamantyl benzene, and forming the 1,4-bis(4-aminophenoxy)-2-adamantyl benzene.

The formation of the 2-adamantyl hydroquinone comprises the following steps. Firstly, 15 g of 1-bromoadamantane (69.77 mmol), 15.35 g of hydroquinone compound (139.5 mmol), and 75 ml of benzene are added into the 250 ml of the three-necked flask under nitrogen ambient. The solution is heating refluxed for 72 hours. The temperature of the reaction is about 80-85° C. as the boiling point of benzene. It is worth noting that a large amount of white fumes is produced in the process of reaction and the color of the solution would become deeper.

After the reaction, solid 2-adamantyl hydroquinone is separated out and is obtained directly by the method of filtration. After the filtration, solid 2-adamantyl hydroquinone is washed by the heated water to remove the remaining hydroquinone compound. Next, 2-adamantyl hydroquinone is vacuum dried and recrystallized by toluene to enhance the purity of the 2-adamantylhydroquinone. Then, 12.21 g of 2-adamantylhydroquinone is obtained. The appearance of 2-adamantylhydroquinone is yellow transparent, needle-like crystal, the yield of 2-adamantylhydroquinone is 71.73%, the melting point (mp) of 2-adamantylhydroquinone is 217-219° C., and the property of 2-adamantylhydroquinone is listed as below:

IR (KBr) 3437, 3390, 3047, 3015, 2898, 2848, 1597, 1507, 1457 cm−1; MS (EI) m/z 244 (M+, 100), 186 (12).

Formation of 1,4-bis(4-notrophenoxy)-2-adamantyl benzene comprises the following steps. Firstly, 2 g of 2-adamantyl hydroquinone (8.197 mmol), 2.7 g of 4-nitrochlorobenzene (17.14 mmol), 1.5 g of potassium carbonate (10.87 mmol), and 40 ml of dimethylformamide are added to the 125 ml three-necked flask under the nitrogen ambient. The solution is heating refluxed at 130-135° C. for 12 hours.

After the reaction, the color of the solution would be dark brown. Then, the pale yellow solid 1,4-bis(4-notrophenoxy)-2-adamantyl benzene is precipitated out by adding the distilled water. Then, 1,4-bis(4-notrophenoxy)-2-adamantyl benzene is washed several times by the distilled water and vacuum dried. Next, solid 1,4-bis(4-notrophenoxy)-2-adamantyl benzene is recrystallized to enhance the purity. Then, 3.51 g of pale yellow fibrous crystal 1,4-bis(4-notrophenoxy)-2-adamantyl benzene is obtained with 88.1% of the yield, and approximately 190-192° C. of the melting point. The property of 1,4-bis(4-notrophenoxy)-2-adamantyl benzene is listed as below:

IR (KBr) 3078, 2903, 2847, 1608, 1591, 1512, 1478, 1341 cm−1; MS (EI) m/z 486 (M+, 100), 152 (40), 78 (70).

Formation of 1,4-bis(4-aminophenoxy)-2-adamantyl benzene comprises the following steps. Firstly, 2 g of 1,4-bis(4-notrophenoxy)-2-adamantyl benzene (4.12 mmol), 20 ml of hydrazine monohydrate, 0.09 g of Pd/C catalyst (10%), and 70 ml of ethanol are added into the 250 ml three-necked flask under nitrogen ambient. Then, the solution is heating refluxed for 24 hours at 110° C. Next, the solution after heating reflux is filtered directly and is condensed.

After cooling down, pale yellow solid 1,4-bis(4-aminophenoxy)-2-adamantyl benzene is precipitated out. Then, 1,4-bis (4-aminophenoxy)-2-adamantyl benzene is washed several times with the distilled water and vacuum dried. Next, solid 1,4-bis(4-aminophenoxy)-2-adamantyl benzene is recrystallized to enhance the purity. The 1.54 g of pale brown crystal 1,4-bis(4-aminophenoxy)-2-adamantyl benzene is obtained with 87.85% of the yield, and approximately 171 to 172° C. of the melting point. The property of 1,4-bis(4-aminophenoxy)-2-adamantyl benzene is listed as below:

IR (KBr) 3469, 3406, 3383, 3336, 3215, 3055, 2902, 2848, 1626, 1505, 1479, 1451, 1402 cm−1; MS (EI) m/z 426 (M+, 100), 213 (18), 107 (54).

Next, the manufacturing method of above-mention dianhydride monomer (b) is introduced. The manufacturing method comprising four main steps: forming hydroquinone compound (b2), forming bis(3,4-dicyanophenoxy) compound (b3), forming bis(3,4-dicarboxyphenoxy) compound (b4), and dianhydride monomer (b).

The formation of hydroquinone compound (b2) is the same as the formation of hydroquinone compound (a2), thus the steps would be omitted thereafter. The formation of bis(3,4-dicyanophenoxy) compound (b3) comprises the following steps. Firstly, purified hydroquinone compound (b2), potassium carbonate ($K_2CO_3$), toluene, and dimethylformamide (DMF) are added into the reactor and heating refluxed for 4 to 5 hours. The hydroquinone compound (b2) is dehydrated by the method of azeotrope to from the ionized hydroquinone having the anion. The temperature of azeotrope is about 150 to 160° C. The general structure formula of ionized hydroquinone compound (b2) is shown as formula (VII):

formula (VII)

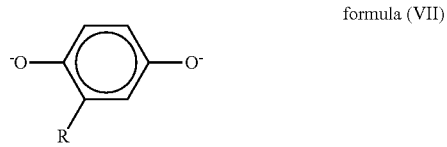

Continued from the preceding paragraph, next, the solution containing ionized hydroquinone compound (b2) and 4-nitrophthalonitrile is heated at 70 to 85° C. for 6 to 12 hours, so as to form bis(3,4-dicyanophenoxy) compound (b3) solution. Then, the methanol is utilized as the precipitant to precipitate out solid bis(3,4-dicyanophenoxy) compound (b3). Next, solid bis(3,4-dicyanophenoxy) compound (b3) is washed by the distilled water, to remove the excess solvent and the reactant. Then, the above-mentioned solution is vacuum dried to obtain the powder bis(3,4-dicyanophenoxy) compound (b3). Subsequently, the bis(3,4-dicyanophenoxy) compound (b3) is recrystallized to enhance the purity. The general structure formula of bis(3,4-dicyanophenoxy) compound (b3) is shown as formula (VIII):

formula (VIII)

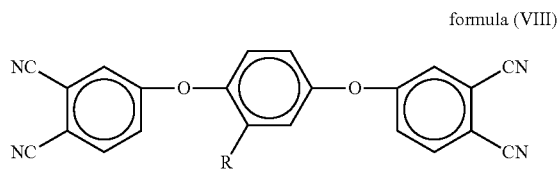

The reaction of forming bis(3,4-dicyanophenoxy) compound (b3) is listed as reaction (IV):

reaction (IV)

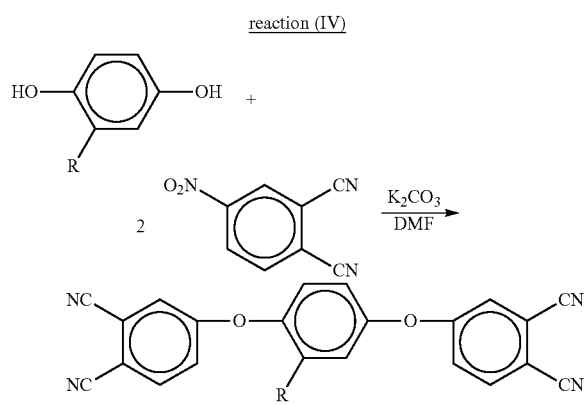

The formation of bis(3,4-dicarboxyphenoxy) compound (b4) comprises the following steps. The bis(3,4-dicyanophenoxy) compound (b3), potassium hydroxide, and methanol are added to the reactor and heating refluxed for 4 to 5 days. The methanol is taken as the solvent of bis(3,4-dicyanophenoxy) compound (b3) and potassium hydroxide. The reaction temperature is about 70 to 85° C. as the temperature of methanol boiling point.

After the reaction, bis(3,4-dicarboxyphenoxy) compound (b4) is filtered. Besides, the pH value of the solution of bis(3,4-dicarboxyphenoxy) compound (b4) is adjusted to 2-3 by the hydrogen chloride solution. Therefore, solid bis(3,4-dicarboxyphenoxy) compound (b4) is separated out. Subsequently, solid bis(3,4-dicarboxyphenoxy) compound (b4) is washed by the distilled water to remove the excess solvent. The general structure formula of bis(3,4-dicarboxyphenoxy) compound (b4) is shown as formula (IX):

formula (IX)

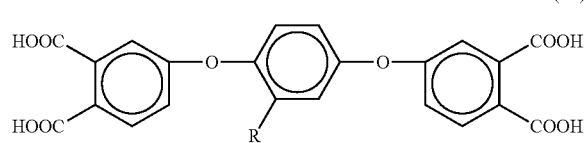

The reaction of forming bis(3,4-dicarboxyphenoxy) compound (b4) is listed as reaction (V):

reaction (V)

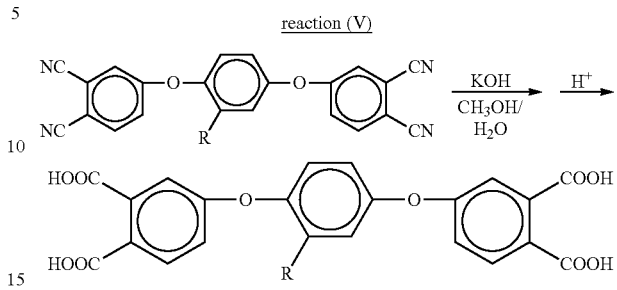

The formation of dianhydride monomer (b) comprises the following steps. The bis(3,4-dicarboxyphenoxy) compound (b4), acetic anhydride, and acetic acid anhydride are added into the reactor and heating refluxed at 130 to 140° C. for 1 to 6 hours. The dehydrated ring-closure of the above-mentioned solution is carried out by the method of heating reflux to form dianhydride monomer (b). The general structure formula of dianhydride monomer (b) is shown as formula (X):

formula (X)

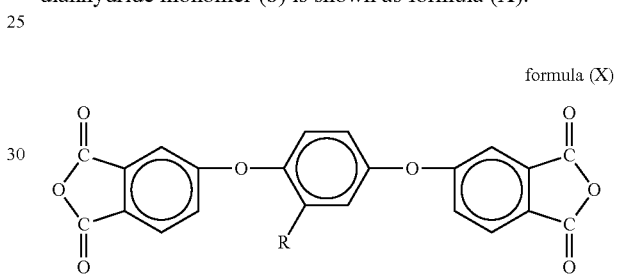

The reaction of forming dianhydride monomer (b) is listed as reaction (VI):

reaction (VI)

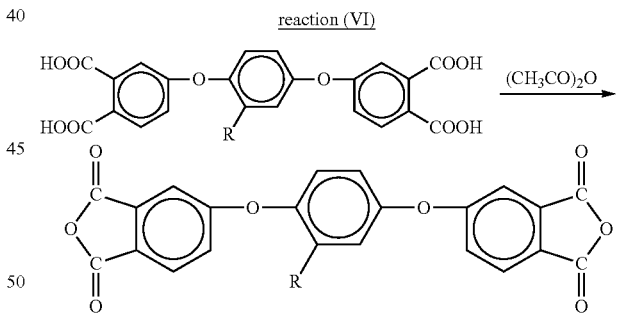

In the following paragraph, adamantyl is chosen to be the large functional group R of dianhydride monomer (b) in this embodiment. However, the embodiment is merely shown for exemplary purpose rather than being used to restrict the scope of the present invention.

Second Embodiment

The dianhydride monomer (e) in the first embodiment of the present invention is 1,4-bis(3,4-dicarboxyphenoxy)-2-adamantyl benzene dianhydride, the structure formula of the 1,4-bis(3,4-dicarboxyphenoxy)-2-adamantyl benzene dianhydride is shown as formula (XI):

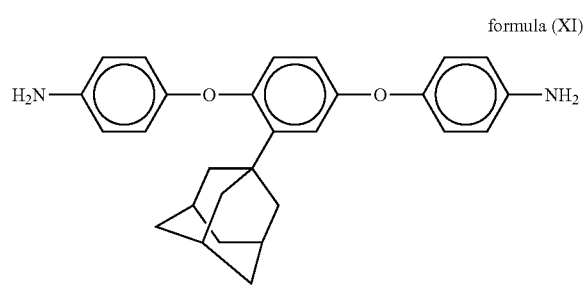

formula (XI)

The formation of the dianhydride monomer comprise the following four steps: forming the 2-adamantyl hydroquinone, forming 1,4-bis(3,4-dicyanophenoxy)-2-adamantyl benzene, forming 1,4-bis(3,4-dicarboxyphenoxy)-2-adamantyl benzene, and forming 1,4-bis(3,4-dicarboxyphenoxy)-2-adamantyl benzene dianhydride.

The formation of the 2-adamantyl hydroquinone comprises the following steps. Firstly, 15 g of 1-bromoadamantane (69.77 mmol), 15.35 g of hydroquinone compound (139.5 mmol), and 75 ml of benzene are added into the 250 ml the three-necked flask in nitrogen ambient. The solution is heating refluxed for 72 hours. The temperature of the reaction is about 80-85° C. as the temperature of benzene boiling point. It is worth noting that a large amount of white fumes is produced in the process of reaction and the color of the solution would become deeper.

After the reaction, solid 2-adamantyl hydroquinone is separated out and is obtained directly by the method of filtration. After the filtration, solid 2-adamantyl hydroquinone is washed by the heated water to remove the remaining hydroquinone compound. Next, 2-adamantyl hydroquinone is vacuum dried and recrystallized by toluene to enhance the purity of the 2-adamantylhydroquinone. Then, 12.21 g of 2-adamantylhydroquinone is obtained. The appearance of 2-adamantylhydroquinone is yellow, transparent, needle-like crystal, the yield of 2-adamantylhydroquinone is approximately 71.73%, the melting point (mp) of 2-adamantylhydroquinone is 217-219° C., and the property of 2-adamantylhydroquinone is listed as below:

IR (KBr) 3437, 3390, 3047, 3015, 2898, 2848, 1597, 1507, 1457 cm−1; MS (EI) m/z 244 (M+, 100), 186 (12).

The formation of 1,4-bis(3,4-dicyanophenoxy)-2-adamantyl benzene comprises the following steps. Firstly, 2 g of 2-adamantyl hydroquinone (8.197 mmol), 1.25 g of anhydrous potassium carbonate (9.06 mmol), 6 ml of toluene, and 40 ml of dimethylformamide are added to the 150 ml of the three-necked flask under the nitrogen ambient. The solution is heating refluxed at 150 to 160° C. for 4-5 hours. The hydroquinone compound (b) is dehydrated by azeotropic of water and toluene to form the ionized hydroquinone having the anion.

Next, 3 g of 4-nitrophtalonitrile (17.34 mmol) is added into the above-mentioned solution to further react at 75 to 80° C. for 12 hours. After the reaction, methanol solution is utilized as the precipitant to precipitate out the pale yellow solid initial product of 1,4-bis(3,4-dicyanophenoxy)-2-adamantyl benzene. Then, bis(3,4-dicyanophenoxy)-2-adamantyl benzene is washed several times by the distilled water and vacuum dried. Next, solid bis(3,4-dicyanophenoxy)-2-adamantyl benzene is recrystallized to enhance the purity. Then, 3.08 g of pale yellow crystal bis(3,4-dicyanophenoxy)-2-adamantyl benzene is obtained with 75.8% of the yield, and approximately 260-261° C. of the melting point. The property of bis(3,4-dicyanophenoxy)-2-adamantyl benzene is listed as below:

IR (KBr) 3078, 3039, 2922, 2851, 2236, 1601, 1564, 1480, 1421 cm$^{-1}$; MS (EI) m/z 496 (M$^+$, 100), 439 (25).

The formation of 1,4-bis(3,4-dicarboxyphenoxy)-2-adamantyl benzene comprises the following steps. Firstly, 2 g of 1,4-bis(3,4-dicyanophenoxy)-2-adamantyl benzene (4.032 mmol), 5 g of potassium hydroxide (36.2 mmol) are mixed to prepare a solution containing 50% of each respectively. The 50% solution and 100 ml of methanol are added into the 250 ml three-necked flask in nitrogen ambient. Then, the solution is heating refluxed for 4 to 5 days. Next, the solution after heating reflux is filtered directly. The pH value of the above-mentioned solution of bis(3,4-dicarboxyphenoxy) compound (d) is adjusted to 2-3 by the hydrogen chloride solution. Therefore, initial product of solid 1,4-bis(3,4-dicarboxyphenoxy)-2-adamantyl benzene would be precipitated out. The solid 1,4-bis(3,4-dicarboxyphenoxy)-2-adamantyl benzene is washed several times by the distilled water and dried to obtain the final product.

The formation of 1,4-bis(3,4-dicarboxyphenoxy)-2-adamantyl benzene dianhydride comprises the following steps. Firstly, 1,4-bis(3,4-dicarboxyphenoxy)-2-adamantyl benzene obtained from the above-mentioned process, 30-40 ml of acetic anhydride, and excess acetic acid anhydride are added into the three-necked flask and heating refluxed at 130 to 140° C. The dehydrated ring-closure of the above-mentioned solution is carried out. 1.81 g of 1,4-bis(3,4-dicarboxyphenoxy)-2-adamantyl benzene dianhydride is obtained after cooling down with 83.7% of the yield, and approximately 270-271 of the melting point. The property of 1,4-bis(3,4-dicarboxyphenoxy)-2-adamantyl benzene dianhydride is listed as below:

IR (KBr) 3068, 2896, 2850, 1841, 1771, 1605, 1474, 1439 cm$^{-1}$; MS (EI) m/z 536 (M$^+$, 100), 478 (22).

The above-mentioned description is about the diamine monomer (a) and dianhydride monomer (b) provided in present invention. The polyimide compound (d) made of the above-mentioned diamine monomer (a) and dianhydride monomer (b) is introduced in the following paragraph. The manufacturing method of polyimide compound (d) comprises the method of thermal imidization and chemical imidization. The method of thermal imidization to manufacture the polyimide compound (d) would be introduced firstly. The method of thermal imidization comprises two main steps: forming polyamic acid compound (c) and forming polyimide compound (d).

Formation of polyamic acid compound (f) comprises the following steps. Firstly, diamine monomer (d) is dissolved in anhydrous N-methyl-2-pyrrolidone. The solution is stirred in an ice bath at 0-4° C. Then, dianhydride monomer (e) with the same mole as the diamine monomer (d) is added and stirred for 1-2 hours. After that, the solution containing diamine monomer (d) and dianhydride monomer (e) is stirred at the room temperature for 4-5 hours to from polyamic acid compound (f). The reaction temperature is about 20-25° C. The general formula of the polyamic acid compound (f) is shown as formula (XII) below:

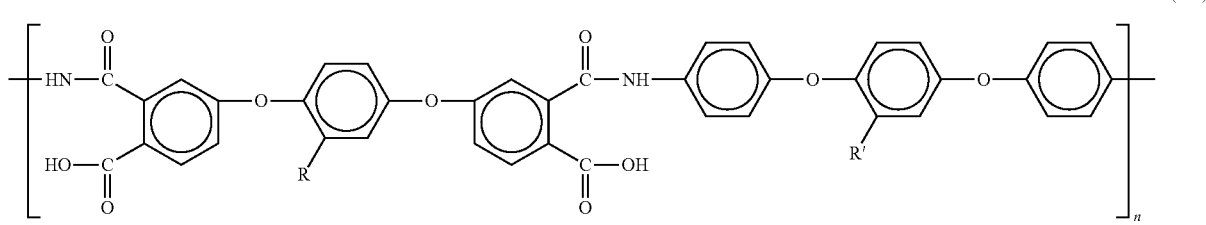

formula (XII)

Formation of solid polyimide compound (d) comprises the following steps. The glass plate is coated with the polyamic acid compound (c) to form the film. Then, the glass plate is backed under vacuum for 100-300° C. Then, polyamic acid compound (f) is cyclized to form the solid polyimide compound (g) under the high temperature. The temperature of reaction is about 300-350° C.

The method of chemical imidization to manufacture the polyimide compound (d) is introduced next. The method of chemical imidization comprises three main steps: forming polyamic acid compound (c), forming liquid polyimide compound (d) and forming solid polyimide compound (d).

Formation of polyamic acid compound (c) comprises the following steps. The dianhydride monomer (b) and diamine monomer (a) are dissolved into cresol with stirred under anhydrous condition to form polyamic acid compound (c). The temperature of the reaction is 20-30° C., and the time of the reaction is 6-7 hours.

Next, formation of liquid polyimide compound (d) comprises the following steps. The 5-10 drops of isoquinoline are dropped into above-mentioned polyamic acid compound (c). The solution is heating refluxed at 100-200° C. for 8-12 hours, to from liquid polyimide compound (d). Herein, isoquinoline is used as dehydrating agent.

It is worth noting that, the step of forming polyimide compound (d) is a dehydrating step, and thus the process must be conducted under anhydrous condition. In general, nitrogen or other inert gas would be introduced to avoid the influence of the moisture. In addition, cresol could be p-cresol or m-cresol, and the present invention is not limited thereto. Furthermore, the heating reflux process of solution contained polyamic acid compound (c) and isoquinoline could be divided into three steps. Firstly, the solution is heating refluxed at 90-100° C. for 2-4 hours. After that, the temperature of the reaction would be raised to 140-150° C. and the solution is heating refluxed for 2-4 hours. Next, the reaction temperature would be raised to 200-210° C. and the solution is heating refluxed for 2-4 hours.

Continued from the preceding paragraph, the above-mentioned solution of polyimide compound (d) is cooled to 20-30° C., and added into ethanol. Then, solid polyimide compound (d) is precipitated out. The solid polyimide compound (d) could be distilled by ethanol, and be obtained by the method of extraction to enhance the purity. The reaction temperature of the distillation is about 70-80° C. as the boiling point of the ethanol. The reaction time is 4-6 hours. Then, the solid polyimide compound (d) is obtained by the process of vacuum dry.

In order to further appreciate the contents of the present invention, diamine monomer (d) obtained from the first embodiment hereunder is reacted with dianhydride obtained from the second embodiment hereunder to form the polyimide (d). However, the present invention is not limited thereto. It is worth noting that both of the thermal imidization and the chemical imidization are utilized to form the following polyimide compounds. Both of the methods are detail describe hereunder, and would be omitted thereafter.

Third Embodiment 1,4-bis(4-aminophenoxy)-2-adamantyl benzene is taken as the diamine monomer (a) of the polyimide (d) and 1,4-bis (3,4-dicarboxyphenoxy)-2-adamantyl benzene dianhydride as the dianhydride monomer (b) of the polyimide (d) to form the polyimide compound (d) in the third embodiment of the present invention. The formula of the polyimide (d) in the third embodiment of present invention is shown as formula (XIII) below:

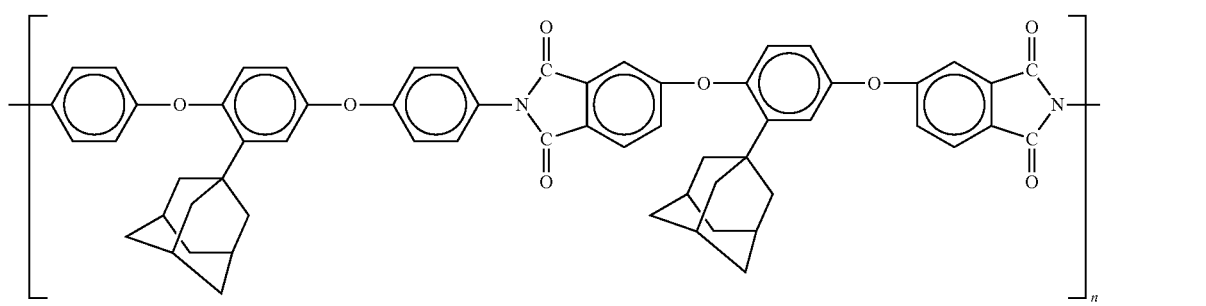

formula (XIII)

To sum up, the present invention provides polyimide compound and the manufacturing method thereof. The above-mentioned polyimide compound has larger size of the side chain, and thus the symmetry in structure and the regularity in molecular arrangement of polyimide compound are interrupted. In addition, according to the result of the solubility test, the polyimide compounds with larger size functional groups are soluble in various kinds of solvent. Furthermore, above-mentioned polyimide compounds can still maintain desired mechanical and thermal property.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of polyimide compound having side chain, comprising:
(A) dissolving diamine monomer (a) and dianhydride monomer (b) into cresol by stirring under anhydrous condition to form polyamic acid compound (c) solution, wherein the general formula of diamine monomer (a) is shown as formula (V) below:

Formula (V)

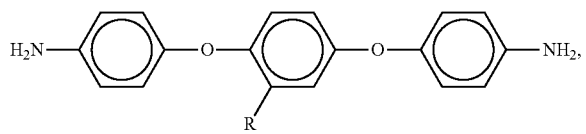

wherein the general formula of dianhydride monomer (b) is shown as formula (X) below:

formula (X)

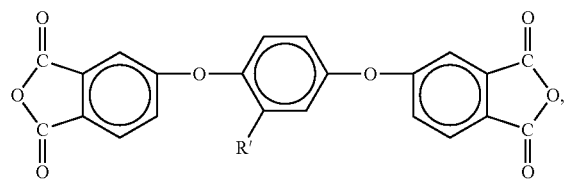

wherein the general formula of polyamic acid compound (c) is shown as formula(XII) below formula (XII)

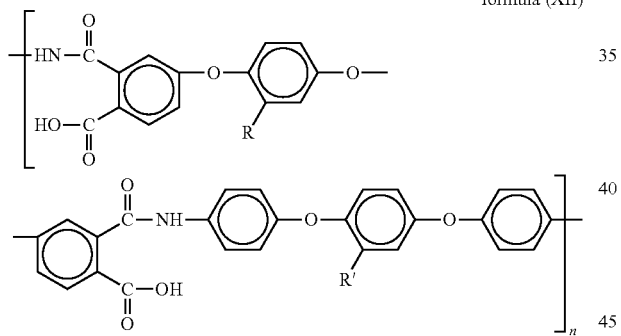

wherein R and R' comprises aromatic hydrocarbon or alicyclic hydrocarbon,
wherein the reaction temperature is 20 to 30, the reaction time is 6 to 7 hours;
(B) adding 5-10 drops of isoquinoline into polyamic acid compound solution, and heating refluxing the solution to form polyimide compound solution,
wherein the reaction temperature is 100 to 200, the reaction time is 8 to 12 hours; and
(C) cooling polyimide compound (d) solution and adding polyimide compound solution (d) into ethanol to precipitate out solid polyimide compound (d),
wherein the general formula of polyimide compound (d) is shown as formula (I) below:

formula (I)

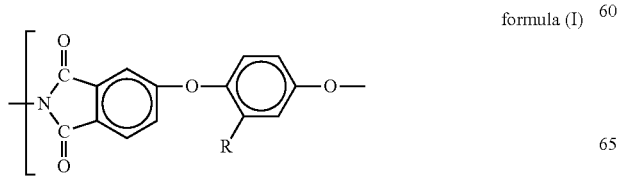

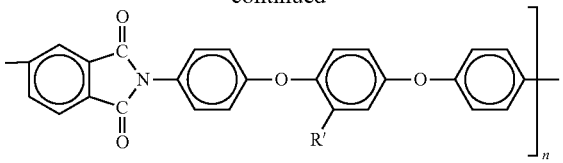

(D) heating refluxing solid polyimide compound (d) and ethanol,
wherein the reaction temperature is 70 to 80, the reaction time is 4 to 6 hours.

2. The manufacturing method of polyimide compound having side chain of claim 1, wherein aromatic hydrocarbon comprises phenyl, naphthalyl, anthracenyl or phenanthrenyl, and alicyclic hydrocarbon comprises adamantyl or diamantyl.

3. The manufacturing method of polyimide compound having side chain of claim 1, wherein the R and R' are α-substitution group.

4. The manufacturing method of polyimide compound having side chain of claim 1, wherein cresol comprises p-cresol or m-cresol.

5. A manufacturing method of polyimide compound having side chain, comprising:
(A) dissolving diamine monomer (a) and dianhydride monomer (b) into cresol by stirring under anhydrous condition to form polyamic acid compound (c) solution, wherein the general formula of diamine monomer (a) is shown as formula (V) below:

Formula (V)

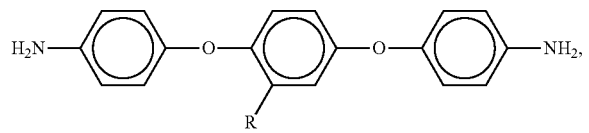

wherein the general formula of dianhydride monomer (b) is shown as formula (X) below:

formula (X)

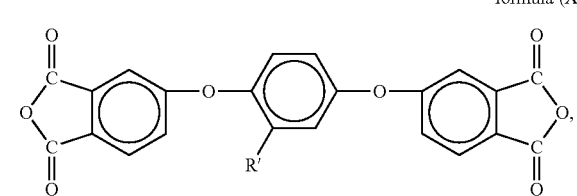

wherein the general formula of polyamic acid compound (c) is shown as formula(XII) below formula (XII)

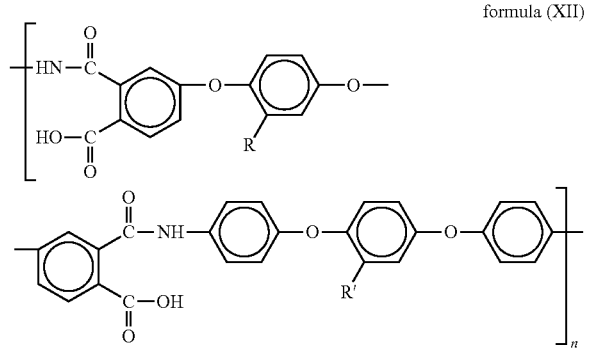

wherein R and R' comprises aromatic hydrocarbon or alicyclic hydrocarbon,
wherein the reaction temperature is 20 to 30, the reaction time is 6 to 7 hours;

(B-1) heating refluxing the solution comprising polyamic acid compound (c) and isoquinoline at 90-100,
wherein the reaction time is 2 to 4 hours;
(B-2) raising the reaction temperature to 140-150 and heating refluxing the solution comprising polyamic acid compound (c) and isoquinoline,
wherein the reaction time is 2 to 4 hours;
(B-3) raising the reaction temperature to 200-210 and heating refluxing the solution comprising polyamic acid compound (c) and isoquinoline,
wherein the reaction time is 2 to 4 hours; and
(C) cooling polyimide compound (d) solution and adding polyimide compound solution (d) into ethanol to precipitate out solid polyimide compound (d),
wherein the general formula of polyimide compound (d) is shown as formula (I) below:

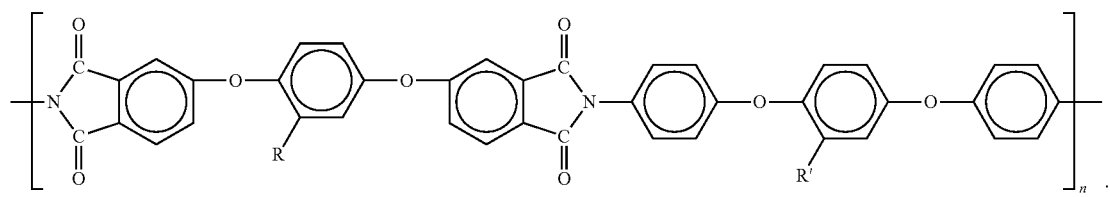

formula (I)

* * * * *